(12) United States Patent
Gailey et al.

(10) Patent No.: US 8,073,920 B2
(45) Date of Patent: *Dec. 6, 2011

(54) SERVICE AUTHORIZER

(75) Inventors: Michael L. Gailey, Dunwoody, GA (US); Eric A. Portman, Norcross, GA (US); Michael J. Burgiss, Smyrna, GA (US)

(73) Assignee: Accenture Global Services Limited, Dublin (IE)

( * ) Notice: Subject to any disclaimer, the term of this patent is extended or adjusted under 35 U.S.C. 154(b) by 41 days.

This patent is subject to a terminal disclaimer.

(21) Appl. No.: 12/245,508

(22) Filed: Oct. 3, 2008

(65) Prior Publication Data

US 2009/0098862 A1    Apr. 16, 2009

Related U.S. Application Data

(63) Continuation of application No. 10/263,566, filed on Oct. 3, 2002, now Pat. No. 7,441,016.

(60) Provisional application No. 60/326,826, filed on Oct. 3, 2001.

(51) Int. Cl.
*G06F 15/16* (2006.01)

(52) U.S. Cl. ........ 709/207; 709/206; 709/217; 709/219; 709/225; 709/227; 709/229; 455/414.1; 455/414.2; 455/414.3; 455/415; 455/416; 455/417; 370/352; 370/353; 379/88.13

(58) Field of Classification Search .................. 709/206, 709/219, 207, 217, 225, 227, 229; 455/414.1, 455/414.2, 414.3, 415, 416, 417; 370/352, 370/353; 379/88.13
See application file for complete search history.

(56) References Cited

U.S. PATENT DOCUMENTS

| | | | | |
|---|---|---|---|---|
| 5,506,961 A | * | 4/1996 | Carlson et al. | 726/5 |
| 5,561,769 A | | 10/1996 | Kumar et al. | 395/200.05 |
| 5,675,507 A | | 10/1997 | Bobo, II | 364/514 R |
| 5,706,427 A | * | 1/1998 | Tabuki | 726/5 |
| 5,764,762 A | | 6/1998 | Kazmierczak et al. | 380/4 |
| 5,832,209 A | * | 11/1998 | Krantz | 726/4 |
| 5,850,517 A | | 12/1998 | Verkler et al. | 395/200.32 |
| 5,862,325 A | | 1/1999 | Reed et al. | 395/200.31 |
| 5,870,549 A | * | 2/1999 | Bobo, II | 709/206 |
| 5,884,262 A | | 3/1999 | Wise et al. | 704/270 |

(Continued)

FOREIGN PATENT DOCUMENTS

WO    WO 99/55049 A1    10/1999

(Continued)

OTHER PUBLICATIONS

U.S. Appl. No. 12/327,670, filed Dec. 3, 2008, Gailey et al.

(Continued)

*Primary Examiner* — John Follansbee
*Assistant Examiner* — Saket K Daftuar
(74) *Attorney, Agent, or Firm* — Brinks Hofer Gilson & Lione

(57) ABSTRACT

A service authorizer system for pushing and pulling data service authorization requests to wireless terminals is disclosed herein. The wireless terminal or a service authorization server may generate requests for authorization. The wireless terminal may generate a request for authorization that is sent to the service authorization server, which generates a multi-modal response and transmits the multi-modal response to the user. The service authorization server may also generate a multi-modal request for authorization that is sent to the wireless terminal.

22 Claims, 5 Drawing Sheets

U.S. PATENT DOCUMENTS

| | | | | |
|---|---|---|---|---|
| 5,905,736 | A | 5/1999 | Ronen et al. | 370/546 |
| 5,908,469 | A * | 6/1999 | Botz et al. | 726/4 |
| 5,920,835 | A | 7/1999 | Huzenlaub et al. | 704/235 |
| 5,944,824 | A | 8/1999 | He | 713/201 |
| 5,953,392 | A | 9/1999 | Rhie et al. | 379/88.13 |
| 6,052,367 | A | 4/2000 | Bowater et al. | 370/352 |
| 6,070,189 | A | 5/2000 | Bender et al. | 709/224 |
| 6,119,167 | A * | 9/2000 | Boyle et al. | 709/234 |
| 6,138,158 | A | 10/2000 | Boyle et al. | 709/225 |
| 6,145,084 | A * | 11/2000 | Zuili et al. | 726/3 |
| 6,157,941 | A | 12/2000 | Verkler et al. | 709/202 |
| 6,161,139 | A | 12/2000 | Win et al. | 709/225 |
| 6,173,259 | B1 * | 1/2001 | Bijl et al. | 704/235 |
| 6,181,781 | B1 | 1/2001 | Porter et al. | 379/88.17 |
| 6,182,142 | B1 | 1/2001 | Win et al. | 709/229 |
| 6,182,144 | B1 | 1/2001 | England | 709/232 |
| 6,219,638 | B1 | 4/2001 | Padmanabhan et al. | 704/235 |
| 6,236,768 | B1 | 5/2001 | Rhodes et al. | 382/306 |
| 6,243,816 | B1 | 6/2001 | Fang et al. | 713/202 |
| 6,249,291 | B1 | 6/2001 | Popp et al. | 345/473 |
| 6,263,358 | B1 | 7/2001 | Lee et al. | 709/100 |
| 6,282,270 | B1 | 8/2001 | Porter | 379/88.17 |
| 6,301,245 | B1 * | 10/2001 | Luzeski et al. | 370/352 |
| 6,314,108 | B1 | 11/2001 | Ramasubramani et al. | 370/465 |
| 6,333,973 | B1 | 12/2001 | Smith et al. | 379/88.12 |
| 6,345,245 | B1 | 2/2002 | Sugiyama et al. | 704/10 |
| 6,385,586 | B1 * | 5/2002 | Dietz | 704/277 |
| 6,393,467 | B1 | 5/2002 | Potvin | 709/217 |
| 6,401,211 | B1 * | 6/2002 | Brezak et al. | 726/5 |
| 6,405,033 | B1 * | 6/2002 | Kennedy et al. | 455/414.1 |
| 6,449,344 | B1 | 9/2002 | Goldfinger et al. | 379/88.17 |
| 6,453,337 | B2 | 9/2002 | Miller et al. | 709/204 |
| 6,473,612 | B1 | 10/2002 | Cox et al. | 455/414 |
| 6,483,899 | B2 * | 11/2002 | Agraharam et al. | 379/88.14 |
| 6,504,910 | B1 | 1/2003 | Engelke et al. | 379/52 |
| 6,510,417 | B1 | 1/2003 | Woods et al. | 704/275 |
| 6,513,003 | B1 | 1/2003 | Angell et al. | 704/235 |
| 6,516,316 | B1 | 2/2003 | Ramasubramani et al. | 707/9 |
| 6,523,063 | B1 | 2/2003 | Miller et al. | 709/206 |
| 6,546,005 | B1 | 4/2003 | Berkley et al. | 370/353 |
| 6,587,835 | B1 | 7/2003 | Treyz et al. | 705/14 |
| 6,594,348 | B1 | 7/2003 | Bjurstrom et al. | 379/88.13 |
| 6,598,018 | B1 | 7/2003 | Junqua | 704/251 |
| 6,647,257 | B2 | 11/2003 | Owensby | 455/414.1 |
| 6,647,272 | B1 * | 11/2003 | Asikainen | 455/466 |
| 6,681,115 | B1 * | 1/2004 | McKenna et al. | 455/517 |
| 6,687,339 | B2 * | 2/2004 | Martin | 379/88.14 |
| 6,697,474 | B1 * | 2/2004 | Hanson et al. | 379/201.01 |
| 6,721,288 | B1 | 4/2004 | King et al. | 370/310 |
| 6,725,252 | B1 | 4/2004 | Himmel et al. | 709/203 |
| 6,728,758 | B2 * | 4/2004 | Sato | 709/206 |
| 6,741,856 | B2 * | 5/2004 | McKenna et al. | 455/422.1 |
| 6,742,022 | B1 | 5/2004 | King et al. | 709/219 |
| 6,754,665 | B1 | 6/2004 | Futagami et al. | 707/102 |
| 6,757,718 | B1 | 6/2004 | Halverson et al. | 709/218 |
| 6,775,360 | B2 * | 8/2004 | Davidson et al. | 379/88.14 |
| 6,782,253 | B1 | 8/2004 | Shteyn et al. | 455/414.1 |
| 6,782,419 | B2 * | 8/2004 | Tobita et al. | 709/219 |
| 6,816,835 | B2 | 11/2004 | Hayashi | 704/260 |
| 6,820,204 | B1 | 11/2004 | Desai et al. | 713/201 |
| 6,826,407 | B1 * | 11/2004 | Helferich | 455/466 |
| 6,826,692 | B1 | 11/2004 | White | 713/201 |
| 6,829,334 | B1 | 12/2004 | Zirngibl et al. | 379/88.17 |
| 6,834,195 | B2 * | 12/2004 | Brandenberg et al. | 455/456.3 |
| 6,848,542 | B2 | 2/2005 | Gailey et al. | 186/35 |
| 6,859,451 | B1 * | 2/2005 | Pasternack et al. | 370/352 |
| 6,885,861 | B2 * | 4/2005 | Koskelainen | 455/414.2 |
| 6,895,084 | B1 * | 5/2005 | Saylor et al. | 379/88.22 |
| 6,907,112 | B1 * | 6/2005 | Guedalia et al. | 379/88.17 |
| 6,909,708 | B1 * | 6/2005 | Krishnaswamy et al. | 370/352 |
| 6,912,582 | B2 * | 6/2005 | Guo et al. | 709/229 |
| 6,925,307 | B1 * | 8/2005 | Mamdani et al. | 455/466 |
| 6,944,447 | B2 | 9/2005 | Portman et al. | 455/422.1 |
| 6,950,947 | B1 | 9/2005 | Purtell et al. | 713/201 |
| 6,954,641 | B2 * | 10/2005 | McKenna et al. | 455/435.1 |
| 7,003,082 | B2 | 2/2006 | Engelke et al. | 379/52 |
| 7,020,251 | B2 * | 3/2006 | Zirngibl et al. | 379/88.17 |
| 7,136,461 | B1 * | 11/2006 | Swingle et al. | 379/88.13 |
| 7,233,655 | B2 | 6/2007 | Gailey et al. | 379/210.01 |
| 7,254,384 | B2 | 8/2007 | Gailey et al. | 455/412 |
| 7,412,260 | B2 | 8/2008 | Gailey et al. | 455/563 |
| 7,437,295 | B2 | 10/2008 | Pitts, III et al. | 704/275 |
| 7,441,016 | B2 | 10/2008 | Gailey et al. | 709/219 |
| 7,472,091 | B2 | 12/2008 | Gailey et al. | 705/51 |
| 7,483,693 | B2 * | 1/2009 | Lueng et al. | 455/414.1 |
| 7,640,006 | B2 | 12/2009 | Portman et al. | 455/412.1 |
| 7,640,360 | B1 * | 12/2009 | Kawamoto et al. | 709/246 |
| 2001/0024496 | A1 | 9/2001 | Bolduc et al. | 379/222 |
| 2001/0049275 | A1 * | 12/2001 | Pierry et al. | 455/414 |
| 2002/0004736 | A1 | 1/2002 | Roundtree et al. | 705/10 |
| 2002/0022453 | A1 * | 2/2002 | Balog et al. | 455/41 |
| 2002/0035607 | A1 | 3/2002 | Checkoway et al. | 709/206 |
| 2002/0049907 | A1 | 4/2002 | Woods et al. | 713/182 |
| 2002/0055351 | A1 | 5/2002 | Elsey et al. | 455/414 |
| 2002/0061741 | A1 * | 5/2002 | Leung et al. | 455/414 |
| 2002/0068551 | A1 | 6/2002 | Strunk et al. | 455/414 |
| 2002/0091829 | A1 | 7/2002 | Wood et al. | 709/227 |
| 2002/0107925 | A1 | 8/2002 | Goldschneider et al. | 709/206 |
| 2002/0112007 | A1 | 8/2002 | Wood et al. | 709/206 |
| 2002/0119793 | A1 * | 8/2002 | Hronek et al. | 455/466 |
| 2002/0137491 | A1 | 9/2002 | Pentikainen et al. | 455/412 |
| 2002/0144108 | A1 * | 10/2002 | Benantar | 713/156 |
| 2002/0161646 | A1 | 10/2002 | Gailey et al. | 705/14 |
| 2002/0161647 | A1 | 10/2002 | Gailey et al. | 705/14 |
| 2003/0008661 | A1 * | 1/2003 | Joyce et al. | 455/456 |
| 2003/0064709 | A1 * | 4/2003 | Gailey et al. | 455/412 |
| 2003/0078034 | A1 | 4/2003 | Tsutsumi et al. | 455/412 |
| 2004/0054935 | A1 | 3/2004 | Holvey et al. | 713/202 |
| 2004/0059790 | A1 | 3/2004 | Austin-Lane et al. | 709/207 |
| 2004/0166832 | A1 | 8/2004 | Portman et al. | 455/412.1 |
| 2004/0243417 | A9 | 12/2004 | Pitts, III et al. | 704/276 |
| 2005/0020250 | A1 | 1/2005 | Chaddha et al. | 455/414.1 |
| 2005/0027590 | A9 | 2/2005 | Gailey et al. | 705/14 |
| 2005/0027591 | A9 | 2/2005 | Gailey et al. | 705/14 |
| 2005/0102180 | A1 | 5/2005 | Gailey et al. | 705/14 |
| 2008/0270224 | A1 | 10/2008 | Portman et al. | 705/10 |
| 2009/0083290 | A1 | 3/2009 | Gailey et al. | 707/10 |

FOREIGN PATENT DOCUMENTS

| | | |
|---|---|---|
| WO | WO 00/17854 A1 | 3/2000 |
| WO | WO 00/20962 A2 | 4/2000 |
| WO | WO 00/21232 A2 | 4/2000 |
| WO | WO 00/21232 A3 | 11/2000 |
| WO | WO 01/03011 A2 | 1/2001 |
| WO | WO 01/69422 A2 | 9/2001 |
| WO | WO 01/03011 A3 | 1/2003 |

OTHER PUBLICATIONS

"Digital cellular telecommunications system (Phase 2+) (GSM); Universal Mobile Telecommunications System (UMTS); Functional stage 2 description of location services (3GPP TS 23.271 version 5.2.0 Release 5); ETSI TS 123 271" ETSI Standards, European Telecommunication Standards Institute; Sophia-Antipo, FR, vol. 3-SA2, No. V520, Mar. 2002 XP014007890.

"Digital cellular telecommunications system (Phase 2+); Universal Mobile Telecommunications System (UMTS); Location Services (LCS) (3GPP TS 22.271 version 5.2.0 Release 5); ETSI TS 122 071" ETSI Standards, European Telecommunication Standards Institute, Sophia Antipolis Cedex France, Sep. 2003, XP014016349.

Canadian Office Action issued Jan. 28, 2010 in corresponding Canadian Patent Application No. 2,460,896 (2 pgs.).

European Search Report, dated Aug. 22, 2011, pp. 1-8, European Patent Application No. 10183900.9, European Patent Office, Germany.

* cited by examiner

SERVICE AUTHORIZER

This application is a continuation of U.S. patent application Ser. No. 10/263,566 filed on Oct. 3, 2002 now U.S. Pat. No. 7,441,016 and entitled SERVICE AUTHORIZER and claims the benefit under 35 U.S.C. §119 of U.S. Provisional Application Ser. No. 60/326,826 which was filed Oct. 3, 2001 and entitled SERVICE AUTHORIZER. In addition, the following commonly owned patent applications, some of which are incorporated by reference in the present application, are related to this application: U.S. patent application Ser. No. 10/264,219, filed Oct. 3, 2002, entitled VIRTUAL CUSTOMER DATABASE; U.S. Pat. No. 7,254,384 B2, issued Aug. 7, 2007, entitled MULTI-MODAL MESSAGING; U.S. Pat. No. 7,233,655 B2, issued Jun. 19, 2007, entitled MULTI-MODAL CALLBACK, and U.S. patent application Ser. No. 10/751,022, entitled DIRECTORY ASSISTANCE WITH MULTI-MODAL MESSAGING.

FIELD OF THE INVENTION

The present invention generally relates to wireless communication systems and more particularly, to a method and system for obtaining authorization for the release and use of customer proprietary information using a wireless communication device on a wireless network.

BACKGROUND OF THE INVENTION

Wireless communication devices have recently evolved from a technology used by an elite segment of the population to a technology that is used by the masses. Worldwide, the number of wireless communication device users has reached a staggering number and is growing all of the time. In the near future, it is envisioned that almost everyone will own or use some sort of wireless communication device that is capable of performing a variety of functions. In addition to traditional wireless communication devices, many different types of portable electronic devices are in use today. In particular, notebook computers, palm-top computers, and personal digital assistants (PDA) are commonplace.

Today wireless services are typically sold at retail locations to consumers, through websites, or through a customer contact center or call center. The wireless phone subscriber signs a contract, either verbally or on paper, or electronically agrees to the purchase of new or additional services. The wireless service provider also typically sells or leases a respective wireless communication device to the subscriber as well. In some cases, these services are personalized using proprietary customer information such as the subscriber's town of residence for proximity business listing searches close to home, date of birth for horoscopes, an email address for forwarding text messages, or an airline customer reward program number for personalized itinerary information for example. In other words, the subscriber provides the wireless provider with proprietary customer information that gives the wireless provider a profile of the user that is filled with a plurality of personal information entries. The customer may also be a customer of several third-party companies that contain profiles of the subscriber.

The subscriber of the wireless terminal may not desire to obtain data services from respective third-party companies. This may be for several reasons such as the user may not want to pay for the data service or the user may simply not be interested in the data service. Multi-modal messaging in wireless terminals is a new development. This allows users of wireless terminals to send and receive messages in several data formats at the same time. In addition, multi-modal messaging allows the user to receive more data that is easier to manage on their remote terminal during a session. As such, a need exists for methods of incorporating multi-modal messaging in data service authorization and setup.

SUMMARY OF THE INVENTION

A preferred embodiment of the present invention discloses a method of pushing data service authorization over a wireless access network. In this embodiment, a data service list associated with a respective user of a wireless terminal is generated with a service authorization server. A multi-modal request for authorization for at least one data service contained in the data service list is then created by the service authorization server. After being created, the multi-modal request for authorization is transmitted to the wireless terminal. A response to the multi-modal request for authorization is then generated with the wireless terminal. A user profile in a customer database is then updated based on the response to the multi-modal request for authorization. If the user accepts, the user will be able to receive the data service and if the user rejects, the user will not receive the data service and will no longer receive messages related to the data service.

A virtual customer database located on the service authorization server is used to generate the data service list. The virtual customer database contains a user profile associated with the user that is generated from data obtained from a plurality of participating businesses. A service authorizer application on the service authorization server is used to generate the data service list. The multi-modal request for authorization preferentially includes at least a voice-based message and a text-based message. However, the multi-modal request for authorization may include at least two messages selected from a group of messages consisting of a voice-based message, a text-based message, an email message, a short message, a chat message, a video message, a videoconference message, or a voice-mail message.

A second preferred embodiment of the present invention discloses a method of pulling data service authorizations over a wireless access network. In this embodiment, a request for authorization to receive a data service is generated with a wireless terminal assigned to a respective user. The request for authorization is then transmitted to a service authorization server. The service authorization server then determines if the user is authorized to receive the data service. A multi-modal response is then generated to the request for authorization by the service authorization server that is transmitted to the wireless terminal. A user profile in a virtual customer database associated with the service authorization server is then updated based on the multi-modal response.

A third preferred embodiment of the present invention discloses a method of pushing data service authorizations over a wireless access network. In this embodiment, a request for authorization to provide a data service to a wireless terminal is received from a participating company server. A multi-modal request for authorization for the data service is generated by a service authorization server. The multi-modal request for authorization is then transmitted from the service authorization server to the wireless terminal. A response to the multi-modal request for authorization is then generated with the wireless terminal and transmitted to the service authorization server. A user profile in a customer database is then updated based on the response to the multi-modal request for authorization. The data service from the participating company server may then be delivered to the wireless terminal if the response contains an authorization indication.

A fourth preferred embodiment of the present invention discloses a method of pushing data service authorizations over a wireless access network. In this embodiment, a request for authorization to receive a data service from a participating company server is generated with a wireless terminal that is assigned to a respective user. The data service is to be received at a future time period, which means a future date and time. The request for authorization is then transmitted to a service authorization server, which determines if the user is authorized to receive the data service. A multi-modal response is then generated by the service authorization server in response to the request for authorization that is transmitted to the wireless terminal. A user profile in a virtual customer database associated with the service authorization server is then updated based on the multi-modal response. If the user is authorized, the data service will be delivered to the wireless terminal at the future time period.

Further objects and advantages of the present invention will be apparent from the following description, reference being made to the accompanying drawings wherein preferred embodiments of the invention are clearly illustrated.

DETAILED THE DESCRIPTION OF THE PRESENTLY PREFERRED EMBODIMENTS OF THE INVENTION

Figure 1:
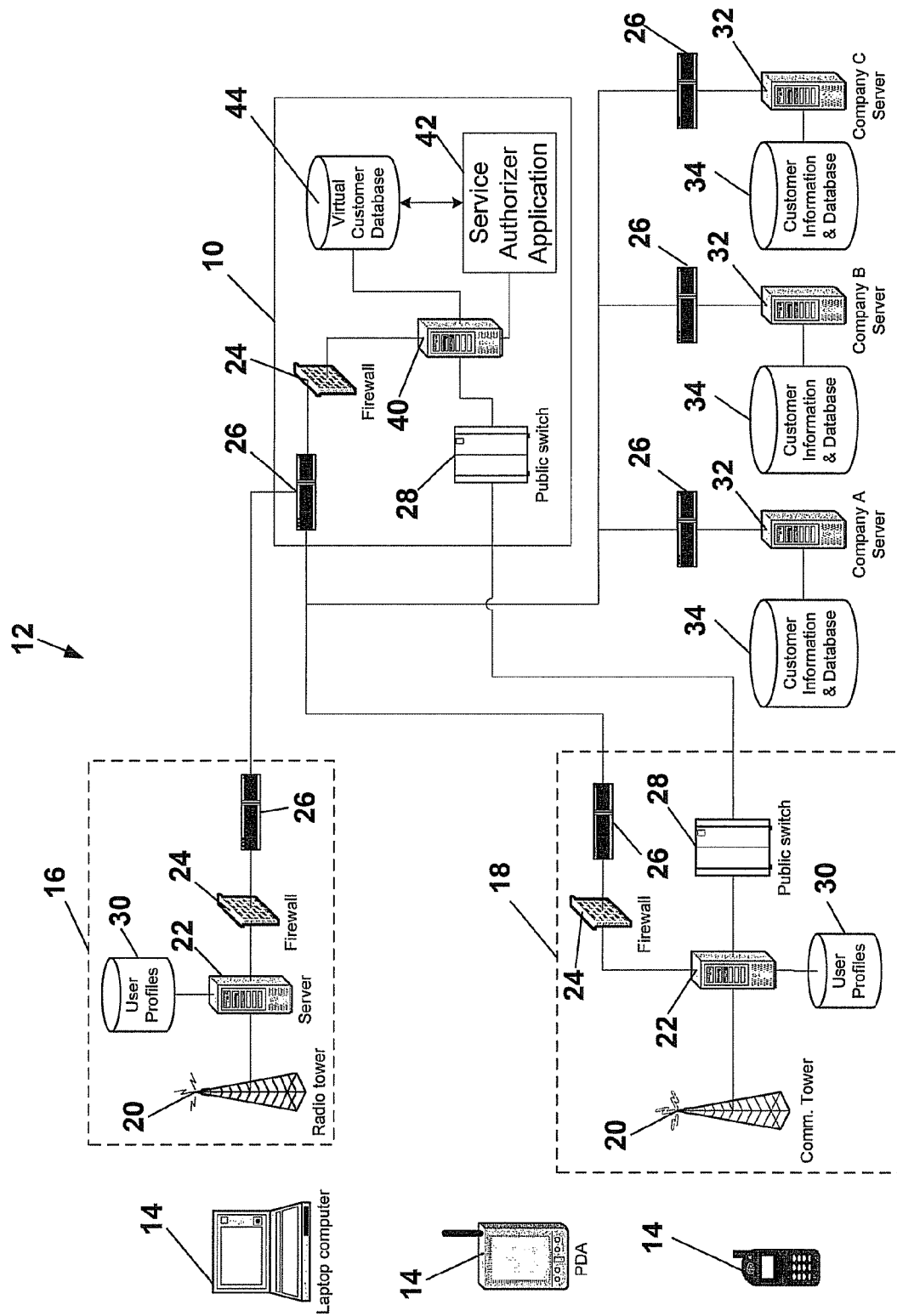
FIG. 1 illustrates a service authorization system for a wireless access network.

Referring to FIG. 1, a preferred embodiment of the present invention discloses a service authorization system 10 for a wireless communication system 12. As illustrated in FIG. 1, the preferred wireless communication system 12 includes a plurality of wireless terminals 14 that are capable of establishing connections with a plurality of wireless access networks 16, 18. The wireless access networks 16, 18 may be operated by the same wireless company or a by a different wireless company. Further, the wireless access network 16, 18 may be selected from a plurality of different types of networks such as a wireless local area network ("WLAN"), a digital wireless access network, or an all-IP digital wireless access network.

Preferentially, the service authorization system 10 is operated by a third-party that is not directly related to the operators of the wireless access networks 16, 18. As set forth in detail below, the separation of relation between the companies allows multiple companies to share data files so that users of the wireless terminals 14 can receive a wide range of data services by using the wireless terminals 14. In alternative embodiments, the service authorization system 10 may be operated by the operators of the wireless access networks 16, 18. As used herein, the term data service is used broadly to refer to a plurality of different services such as web page services, email services, short-message services, voice-mail services, gaming services, file transfer services, chat services and information services (e.g. —stock quotes, news, maps) to name a few.

As illustrated in FIG. 1, the first preferred wireless access network 16 includes a base station 20 that is connected to an access network server 22. The access network server 22 may include a firewall 24 that provides security to the access network server 22. As generally known in the art, the firewall 24 acts as a security buffer between the connection that is established between the access network server 22 and a router 26. As known in the art, the router 26 transmits and receives data or packets of data to predetermined addressed destinations. Preferentially, the first wireless access network 16 is an all IP-based wireless access network.

The second preferred wireless access network 18 also includes a base station 20 that is connected to an access network server 22. As with the previous embodiment, the access network server 22 includes a firewall 24 between the connection that is established between the access network server 22 and the router 26. As further illustrated in FIG. 1, the access network server 22 of the second wireless access network 18 is also connected to a public switch 28. As known in the art, the public switch 28 transmits and receives voice and data signals over networks to and from a respective source and destination node. In this embodiment, the access network server 22 is also capable of sending and receiving data or packets of data using a wireless communication protocol, such as short-message service or wireless application protocol ("WAP"). The data may be sent using these protocols in a wireless markup language ("WML"), HTML, or as plain text.

As further illustrated in FIG. 1, the first and second wireless access networks 16, 18 include a subscriber database 30. The subscriber database 30 preferentially includes information or profiles that are relevant to each subscriber or user of the wireless access network 16, 18. Typically, each user will have a user account that is maintained in the subscriber database 30 of the wireless access network 16, 18. In a secure or multi-user network, the user account is the means by which an individual is allowed access to the wireless access network 16, 18 and its resources. Typically, the owner or operator sets up a user account that consists of information about each user. This user profile may include information such as the user's name, password, address, home telephone number, rights and permissions the user has on the network, or the types of data services the user subscribes to as it relates to the present invention.

A user profile is a computer-based record that is maintained about an authorized user of a multi-user network. User profiles are often used for security reasons as well as for various other reasons, such as billing. This data record can contain such information as the person's access rights, mailbox locations, type of terminal, display settings and capabilities, application settings, hobbies, areas of interest, age, marital status, gender, occupation, income range and so forth. As set forth in greater detail below, during operation this information is gathered and used by the preferred service authorization system 10.

As illustrated in FIG. 1, routers 26 or public switches 28 are preferentially used to interconnect various components of the service authorization system 10. Routers 26 are also used to connect the service authorization system 10 to a plurality of participating company servers 32. Although routers 26 and public switches 28 are illustrated in the preferred embodiment, those skilled in the art should recognize that other types of networking devices could be used to interconnect the various components of the service authorization system 10. As such, the disclosure of routers 26 and public switches 28 should be viewed in an illustrative sense and not as a limitation of the present invention.

The participating company servers 32 have a company database 34 that includes a customer information database as well as a business database. The customer information database contains profile information about consumers of the companies' respective products or services. As such, the customer information database will preferentially likely contain at least the following information: a customer ID, a virtual key associated with the customer, an address, a telephone number, an email address, a work number, and any other relevant data that may be associated with the consumer. The customer information database also preferentially includes a list of data services that the user is authorized to receive from the participating company server 32. The business database includes information about the companies' products or services that may be searched by using a search query.

The preferred service authorization system 10 includes a service authorization server 40 that includes a service authorizer application 42 and a virtual customer database 44. The service authorization system 10 is capable of 1) using multiple modes of communication including those disclosed in U.S. application Ser. No. 10/263,523, filed on Oct. 3, 2002 entitled Multi-Modal Messaging and U.S. application Ser. No. 10/263,501, filed on Oct. 3, 2002 entitled Multi-Modal Callback, which are both hereby incorporated by reference in their entireties; 2) methods for entering into a contractual agreement with a customer for the purpose of using the customer's proprietary data to provide tailored services; 3) methods for the sharing of customer proprietary data for the purpose of providing personalized service to a customer using a wireless communication device 14 on the wireless access networks 16, 18 which are disclosed in U.S. application Ser. No. 10/264,219, filed on Oct. 3, 2002 entitled Virtual Customer Database, which is hereby incorporated by reference in its entirety; and 4) methods for acquiring digital signatures.

The service authorization system 10 is comprised of a sequence of steps for determining authorization between two parties and the process of requesting authorization and receiving a response to that request for authorization. The present invention is comprised of this sequence of operations for both push and pull scenarios, meaning the sequence can happen upon the request of a wireless terminal 14 on the wireless network 16, 18, i.e. pull, or in the push scenario where the wireless carrier or a participating company server 32 sends a message to the customer's wireless communication device 14 without a prior request from the customer. Additionally, the present invention discloses a sequence of method steps that occur prior to or at the time a respective service is delivered or provisioned to the wireless terminal 14.

Figure 2:
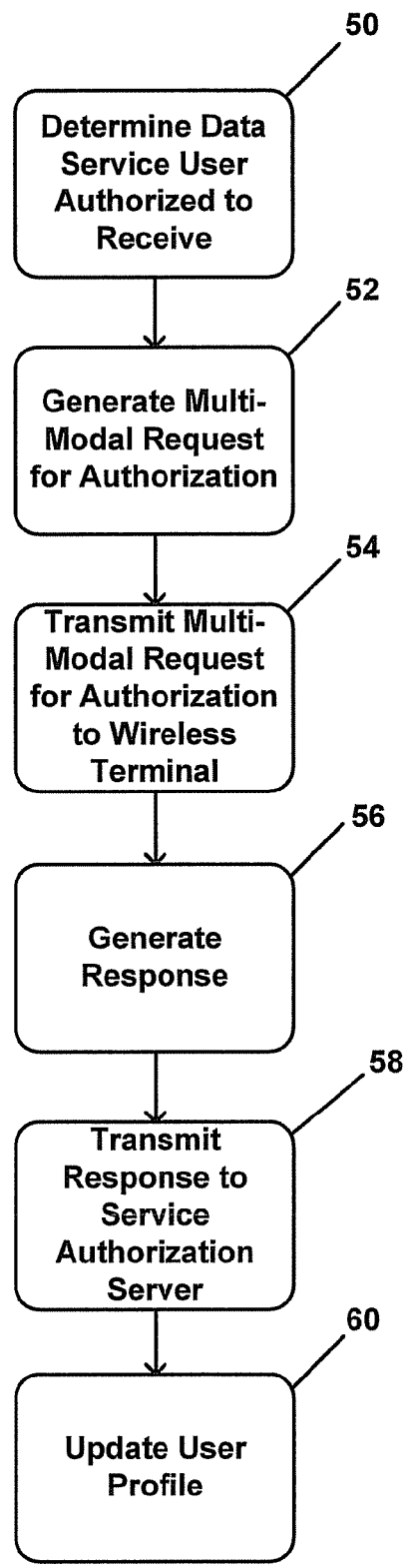
FIG. 2 illustrates steps taken in a pushed request prior to service.

As generally set forth above, one preferred embodiment of the service authorization system 10 discloses a method for pushing requests for authorization to receive data services to the wireless terminal 14 prior to the time that a data service is delivered. Referring to FIG. 2, in this embodiment of the present invention the access network server 22, the service authorization server 40, or a respective participating company server 32 determines at least one data service for which an authorization request should be sent to the wireless terminal 14, which is illustrated at step 50. The access network server 22 may send a request to the service authorization server 40 that causes the service authorizer application 42 to generate a list of data services that the user is authorized to receive and are supported by the wireless access network 16, 18. In the alternative, the service authorizer application 42 or the participating company server 32 may act independently to determine data services that users of the wireless terminals 14 are allowed to access via the wireless access network 16, 18.

The preferred method of determining the data services that the authorization request should be sent for is to retrieve the necessary information from the virtual customer database 44. The virtual customer database 44 is a distributed database of consumer information that is used for the purpose of delivering personalized data services to users of the wireless terminals 14 from a plurality of participating company servers 32. The virtual customer database 44 contains profile information about each user that contains data about the user that is supplied by the participating company servers 32. The service authorizer application 42 is capable of using the virtual customer database 44 to look-up an identity that is associated with the user and obtain a list of data services that are provided by participating company servers 32 that the user is allowed to receive. The user profiles in the virtual customer database 44 will contain an indication or listing of what data services respective users are allowed to receive from the participating company servers 32 as well as a digital key and customer ID that is associated with the user for each respective data service and participating company server 32.

The service authorizer application 42 uses the user profile information associated with the wireless terminal 14, which can be provided by the wireless terminal 14 or the access network server 22, to generate a data service search query that searches the virtual customer database 44 to create a list of data services that the user is authorized to receive that have not been previously authorized by the user. After the potential data service list is generated by the service authorizer application 42, it is used by the service authorizer application 42 to generate at least one request for authorization of data services, which is illustrated at step 52. In the preferred embodiment of the present invention, the request for authorization that is generated by the service authorizer application 42 is a multi-modal message.

At step 54, the multi-modal request for authorization is sent to the wireless access network 16, 18. The access network server 22 may modify the request for authorization of services to remove predetermined data services. The wireless access network 16, 18 then transmits the multi-modal request for authorization of data services to the wireless terminal 14. At the time the request for authorization of data services is sent to the wireless terminal 14, the subscriber of the wireless terminal 14 has not yet indicated an intent to receive these service(s), nor has the subscriber previously been sent a request for authorization of data services. As such, to the user, the process of registering and becoming authorized to receive data services from participating company servers 32 is seamless and automatic. The present embodiment eliminates the need for the user to locate and register with every data service provider from which the user is allowed to receive data services.

As set forth above, the request for authorization of data services is preferentially sent to the subscriber's wireless terminal 14 using multi-modal messaging. In the preferred embodiment of the present invention, the multi-modal request for authorization of data services is preferentially sent to the wireless terminal 14 using a voice-based message and a text-based message. The request for authorization of data services may also include graphic images that are generated on a display of the wireless terminal 14. In other embodiments, the request for authorization of data services may be sent in any message format selected from a group of message formats including a voice-based message, a text-based message, an email message, a short message, a chat message, a video message, or a voice-mail message.

The multi-modal request for authorization of data services preferentially includes a means for allowing the user to responding to the request for authorization of data services using the wireless terminal 14. Preferentially, the subscriber may respond to the request for authorization using either voice-based responses or text-based responses. The user may also respond by selecting menu options or hyperlinks that are generated on a display of the wireless terminal 14. A touch pad or pointing device (such as a mouse) may also be used to generate a response to the request for authorization of data services. As such, at step 56 the user of the wireless terminal 14 generates a response to the multi-modal request for authorization of data services. The response to the multi-modal request for authorization of data services may be generated on the wireless terminal 14 in the form of a multi-modal message in one of several different message formats.

At step 58, the user's response is transmitted to the wireless access network 16, 18 which in turn forwards the response to the service authorizer application 42. After the user has provided an indication of an acceptance or has declined, the user's data or profile will be updated in the virtual customer database 44 to reflect either an acceptance or rejection of the multi-modal request for authorization, which is illustrated at step 60. If the subscriber accepts the request for authorization of data services, the wireless terminal 14 will be able to begin receiving the data services for which the subscriber has accepted service from the participating company server 32. Likewise, if the subscriber rejects the request for authorization, the wireless terminal 14 will not receive the data service that is offered by that particular participating company. The wireless terminal 14 and the access network server 22 may also save the response in the profile that is associated with the user in a memory location on each respective device.

As an example, XYZ airlines may want to receive authorization from the user of the remote terminal 14 to provide a data service to the remote terminal 14. As such, the XYZ airlines company server may send a text message and an email message to the remote terminal 14. The page and email message asks the user of the remote terminal 14 if XYZ airlines can provide service to the user. The remote terminal 14 gives the user the ability to respond yes or no. If the user responds yes, then XYZ airlines can send the user flight information via the remote terminal 14 or the user can call the service and request flight information without having to provide a customer identification number. As set forth above, the service has already been authorized for the remote terminal 14.

Figure 3:
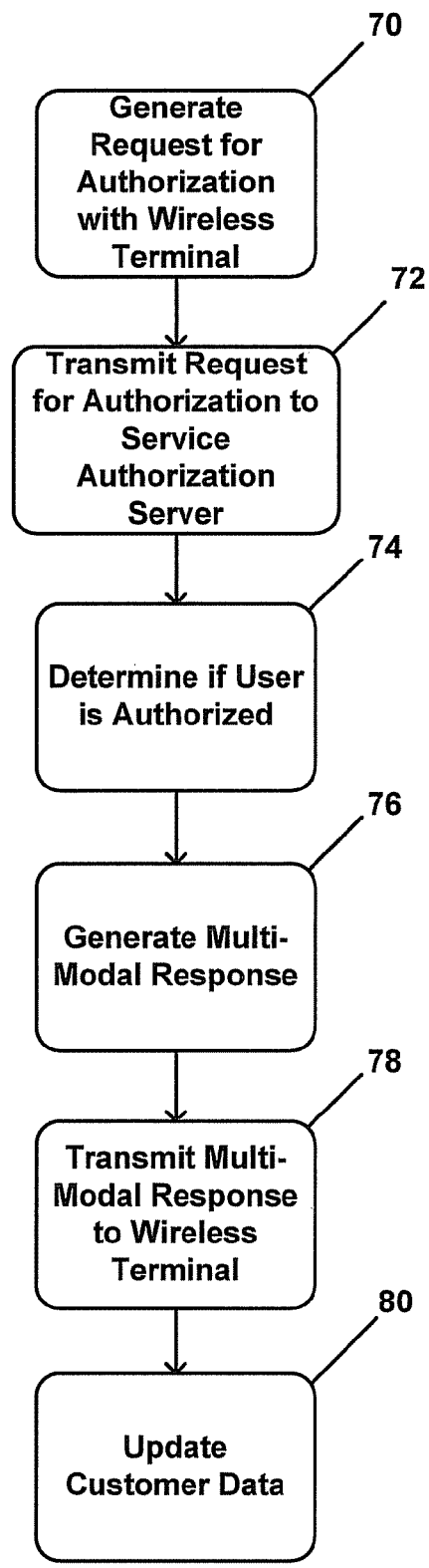
FIG. 3 illustrates steps taken in a pulled request prior to service.

As generally set forth above, another preferred embodiment of the service authorization system 10 discloses a method for pulling requests for authorization to receive data services prior to the time that a data service is delivered to the user of the wireless terminal 14. The sequence of operations for a pulled request prior to service is set forth below and illustrated in FIG. 3. At step 70, the user of the wireless terminal 14 generates a request for authorization of a data service using the wireless terminal 14. The wireless terminal 14 may generate this request by calling a predetermined telephone number to establish a connection or by accessing a web page generated by the service authorization server 40 that contains a list of data services. The user of the remote terminal 14 may also access a participating companies' web page. In essence, the difference between this embodiment and the previous embodiment is that the authorization process is initiated by the user and not the service authorization system 10. At the time the request is sent, the user has not yet indicated an intent to participate in the respective data service(s), nor has the subscriber previously been sent an authorization request.

Unlike the previous preferred embodiment in which the authorization request is pushed to the wireless terminal 14, in this preferred embodiment of the present invention the wireless terminal 14 is used to generate the request for authorization. After the request for authorization is generated by the wireless terminal 14, it is transmitted to the wireless access network 16, 18, which in turn, transmits the request for authorization to the service authorizer application 42 located on the service authorization server 40, which is illustrated at step 72.

Once the service authorization server 40 receives the request for authorization, the service authorizer application 42 then determines if the user of the wireless terminal 14 is authorized to receive the particular data service for which the request for authorization identifies, which is illustrated at step 74. To determine if the user of the wireless terminal 14 is authorized to receive the particular data service for which the request for authorization has identified, the service authorization application 42 preferentially uses the virtual customer database 44. A search query is generated by the service authorization application 42 that uses the identity of the user of the wireless terminal 14 to identify the data services that the user of the wireless terminal 14 is authorized to receive. Likely, the services for which the user would be approved to receive would be from participating companies that are providing services to the user. However, some companies may authorize any user to receive their respective data services either for free or on a fee-based system.

After the service authorizer application 42 has determined that the user is authorized to receive the data service, the service authorizer application 42 generates a multi-modal response to the request for authorization, which is illustrated at step 76. In the preferred embodiment, the multi-modal response includes a voice-based message and a text-based message. At step 78, the multi-modal response is transmitted to the wireless terminal 14. The user's profile in the virtual customer database 44 and most likely, the user profile on the access network server 22, would also be updated to reflect the authorization of that particular data service, which is illustrated at step 80.

As an example, the user of the remote terminal 14 wants to receive data services from XYZ airlines. The user of the remote terminal 14 calls XYZ airlines and receives a prompt that allows the user to register with the data service. At that time, the service authorization server 40 can generate a voice-based message and a text-based message that is sent to the remote terminal 14. The voice-based message may be a question and the text-based message may tell the user how to respond to the question using the remote terminal 14. Once the user has been authorized, the remote terminal 14 will be able to receive data services from XYZ airlines without having to enter any special identifiers or customer numbers. The remote terminal 14 is already authorized to receive the data services.

Figure 4:
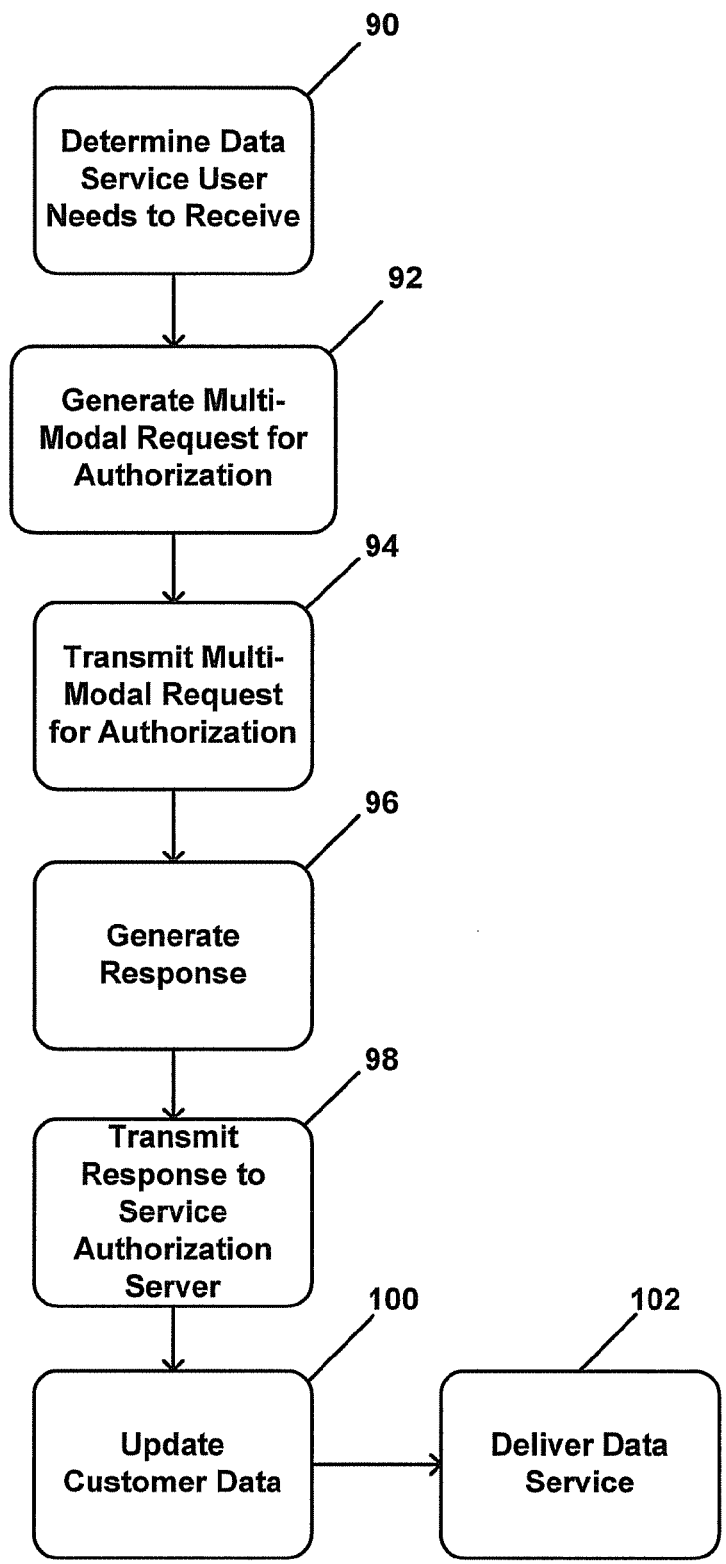
FIG. 4 illustrates steps taken in a pushed request at the time of service.

Yet another preferred embodiment of the present invention discloses a service authorization system 10 capable of generating a pushed authorization request at the time of service. As illustrated in FIG. 4, at step 90, the access network server 22, the service authorization server 40 or a respective participating company server 32 determines that a respective data service needs to be delivered to the user via the user's wireless terminal 14. The data service determination may be made based on the occurrence of a predetermined event. For instance, if the user is taking a flight and the flight is delayed, the participating airline company may want to notify the user of the delay using the wireless terminal 14. However, the user may not have authorized the airline company to send this type of data alert to the user's remote terminal 14. This embodiment allows the airline company to obtain authorization at the time the data service needs to be delivered to the remote terminal 14.

After the data service for which a request for authorization should be generated is determined or the predetermined event occurs, the service authorizer application 42 generates a multi-modal request for authorization, which is illustrated at step 92. The multi-modal request for authorization is then sent to the user's remote terminal 14, which is illustrated at step 94. In our present example, the remote terminal 14 might receive a call from the service authorization server 40 that contains a voice-based message stating that the party indicated in the text-based message listed below is requesting authorization to provide data services to the remote terminal 14. The text-based message might contain the name and address of the airline company as well as any other relevant information the user might need to be provided. The voice-based message or the text-based message may also include an indication that the airline company has important information that needs to be provided to the user at that particular time. At the time the authorization request is sent, the user has preferentially not yet indicated the intent to participate in this data service, nor has the user previously been sent an authorization request.

The multi-modal request for authorization also includes a means for allowing the user to accept or decline to receive the data service identified by the multi-modal request for authorization. At step 96, the user generates a response to the multi-modal request for authorization using the wireless terminal 14. The response is then transmitted by the wireless terminal 14 to the service authorization server 40 which is illustrated at step 98. The response may be a multi-modal response message in some embodiments of the present invention.

After the user has indicated acceptance or has declined, the subscriber's customer proprietary data or profile in the virtual customer database 44 will be updated, which is illustrated at step 100. If the user accepts, an indication of this acceptance will be placed in the virtual customer database 44 as well as other data, such as a digital key associated with the user and the respective company, which may be needed for future use. If the user declines, an indication of the user's non-acceptance will also be placed in the virtual customer database 44 so that the user is no longer sent any notices from the respective data service provider that is identified in the request for authorization.

At step 102, after the user has authorized the data service to be received on the wireless terminal 14, the data services are delivered immediately, or as soon as is technically reasonable, to the wireless terminal 14. In our present example, if the user authorizes the participating airline company to send data services to the remote terminal 14, the notice of the delay can be sent to the wireless terminal 14, preferentially using a multi-modal message. For example, the user may receive a text-based message on the wireless terminal 14 that indicates the delay as well as a voice mail message or email message. The email may include a URL for the user to log into a website to reschedule the flight for example.

Figure 5:
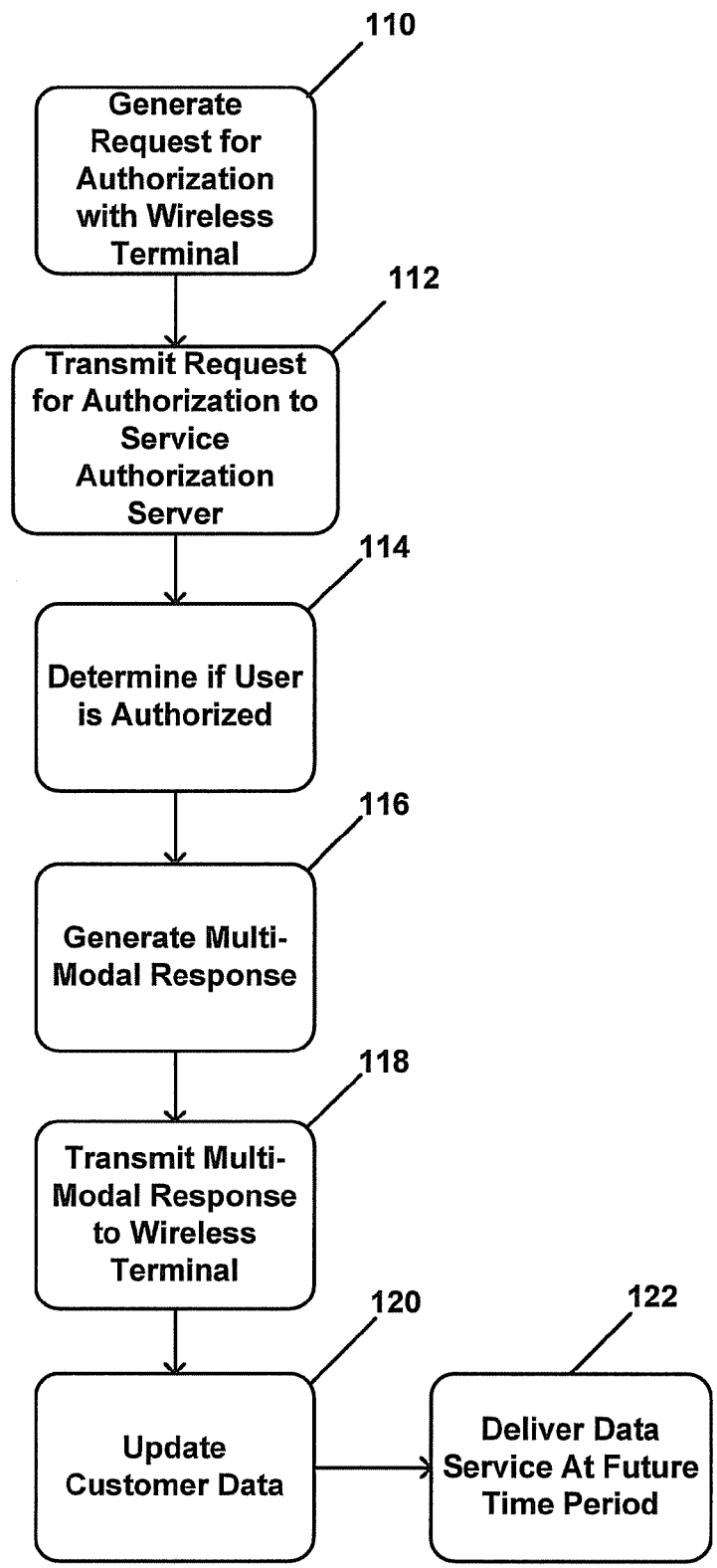
FIG. 5 illustrates steps taken in a pulled request at the time of service.

Referring to FIG. 5, the sequence of operations for a pulled request prior to service is set forth below. The steps performed in this preferred embodiment are very similar to those for a pushed request at the time of service with the only difference being the request for authorization occurs prior to the delivery of the data service and the content of the authorization request indicates service will be delivered at a future time and/or date. At step 110, the user of the wireless terminal 14 generates a request for authorization to receive a data service offered by a participating company server 32 at a future time period with the wireless terminal 14. The wireless terminal 14 may generate this request by calling a predetermined telephone number to establish a connection or by accessing a web page generated by the service authorization server 40 that contains a list of data services.

Unlike the previous preferred embodiment in which the authorization request is pushed to the wireless terminal 14, in this preferred embodiment of the present invention the wireless terminal 14 is used to generate the request for authorization for the data service at the future time period. After the request for authorization is generated by the wireless terminal 14, it is transmitted to the wireless access network 16, 18, which in turn, transmits the request for authorization to the service authorizer application 42 located on the service authorization server 40, which is illustrated at step 112.

Once the service authorization server 40 receives the request for authorization, the service authorizer application 42 determines if the user of the wireless terminal 14 is authorized to receive the particular data service for which the request for authorization identifies, which is illustrated at step 114. To determine if the user of the wireless terminal 14 is authorized to receive the particular data service for which the request for authorization has identified, the service authorization application 42 uses the virtual customer database 44. A search query is generated by the service authorization application 42 that uses the identity of the user of the wireless terminal 14 to identify the types of data services that the user of the wireless terminal 14 is approved to receive. Likely, the services for which the user would be approved to receive would be from participating companies that are providing data services to the user. However, some companies may authorize any user to receive their respective data services either for free or on a fee-based system.

After the service authorizer application 42 has determined that the user is authorized to receive the data service, the service authorizer application 42 generates a multi-modal response to the request for authorization for data service at the future time period, which is illustrated at step 116. In the preferred embodiment, the multi-modal response includes a voice-based message and a text-based message, but other messages may be used as well. At step 118, the multi-modal response is transmitted to the wireless terminal 14. The multi-modal response preferentially also includes a confirmation that the requested data service will be delivered to the wireless terminal 14 at the future time period.

The user's profile in the virtual customer database 44 and most likely, the user profile associated with the access network server 22, would also be updated to reflect the authorization of that particular data service, which is illustrated at step 120. At step 122, which occurs at the future time period, the data service is delivered by a participating company server 32 to the wireless terminal 14.

For example, the user can register with an airline to receive notifications about his/her itinerary. The user registers for the service well before the flight plans are made. Then, when the flight plans are made the service will use the authorization to automatically send itinerary information to the customer's remote terminal 14 one or two hours before the flight. Or the customer can call the system and request the itinerary at any time and they will not need to re-register for the service.

The present invention includes the methods described here where the authorization request contains a request for the use of the customer's proprietary data for a single transaction, or for the use of the data for the duration of the established business relationship between the carrier and user so long as the user is receiving necessary related data services such as a wireless telephone service with text messaging. This invention includes these methods where the services being delivered are services originated by an affiliate of the carrier.

While the invention has been described in its currently best-known modes of operation and embodiments, other modes, embodiments and advantages of the present invention will be apparent to those skilled in the art and are contemplated herein.

What is claimed is:

1. A service authorization system for data service authorization over a wireless access network, the service authorization system comprising:
    a service authorization server computer configured to generate a data service list associated with a respective user of a wireless terminal;
    the service authorization server computer further configured to create and transmit to the wireless terminal, as an unsolicited request, a multi-modal request for authorization for at least one data service included in the data service list, wherein the multi-modal request comprises at least two different message formats that are transmitted over the wireless access network to the wireless terminal;
    the service authorization server computer further configured to receive a response to the multi-modal request for authorization from the wireless terminal; and
    a virtual customer database in communication with the service authorization server computer, wherein the service authorization server computer is further configured to update a user profile of the respective user of the wireless terminal based on the response to the multi-modal request for authorization, wherein the user profile is included in the virtual customer database.

2. The service authorization system of claim 1, wherein the service authorization server computer is further configured to generate the data service list from the virtual customer database based on services identified in the virtual customer database that the respective user is authorized to receive, and for which the respective user has not yet responded to an authorization request for the services.

3. The service authorization system of claim 2, wherein the user profile is generated in the virtual customer database from data obtained from a plurality of participating businesses, wherein different parts of the data are associated with different respective customer identifiers of the respective user that are provided by different respective participating businesses.

4. The service authorization system of claim 1, wherein the service authorization server computer is further configured to generate a query based on the user profile to search the virtual customer database and generate the data service list.

5. The service authorization system of claim 1, wherein the multi-modal request comprises a voice-based message and a text-based message that are separately transmitted to the wireless terminal.

6. The service authorization system of claim 1, wherein the multi-modal request comprises at least two different messages selected from a group of messages consisting of a voice-based message, a text-based message, an email message, a short message, a chat message, a video message, a video conference message, or a voice-mail message.

7. The service authorization system of claim 1, wherein the service authorization server computer is configured to generate the data service list in response to receipt from a participating company server computer of a request for authorization to provide a data service to a wireless terminal.

8. A service authorization system for data service authorizations over a wireless access network, the service authorization system comprising:
    a service authorization server computer configured to receive a request for authorization to receive a data service, the request for authorization transmitted from a wireless terminal over the wireless access network, wherein the wireless terminal is associated with a respective user; and
    a virtual customer database in communication with the service authorization server computer, wherein the virtual customer database includes a user profile of the respective user that is populated with participating company specific data of the respective user, wherein different parts of the participating company specific data is supplied to the virtual customer database from a plurality of respective participating company database server computers;
    the service authorization server computer further configured to access the virtual customer database to determine if the respective user associated with the wireless terminal is authorized to receive the data service in response to receipt of the request for authorization;
    the service authorization server computer further configured to generate a multi-modal response to the request for authorization, wherein the multi-modal response comprises at least two different messages;
    the service authorization server computer further configured to transmit the multi-modal response to the wireless terminal over the wireless access network; and
    the service authorization server computer further configured to update the user profile included in the virtual customer database based on the multi-modal response.

9. The service authorization system of claim 8, wherein the request for authorization to receive the data service includes indication that the data service be delivered at a future time.

10. The service authorization system of claim 9, wherein the multi-modal response includes confirmation that the data service will be delivered to the wireless terminal at the future time.

11. The service authorization system of claim 8, wherein the service authorization server computer is further configured to generate a search query from an identity of the respective user to identify data services the respective user is authorized to receive.

12. The service authorization system of claim 8, wherein the multi-modal response includes at least a voice-based message and a text-based message.

13. The service authorization system of claim 9, wherein the participating company database server computer is configured to deliver the data service to the wireless terminal at the future time.

14. A service authorization system for data service authorizations over a wireless access network, the service authorization system comprising:
    a participating company server computer;
    a service authorization server computer in communication with the participating company server computer, the service authorization server computer configured to receive from the participating company server computer a request for authorization to provide a data service to a wireless terminal;
    the service authorization server computer further configured to create a multi-modal request for authorization for the data service, wherein the multi-modal request for authorization comprises at least two different messages formats;

the service authorization server computer further configured to transmit the multi-modal request for authorization over the wireless access network for receipt by the wireless terminal;

the service authorization server computer further configured to receive a response to the multi-modal request for authorization from the wireless terminal; and a virtual customer database in communication with the service authorization server computer, the service authorization server computer further configured to update a user profile associated with wireless terminal based on the response to the multi-modal request for authorization, and the user profile stored in the virtual customer database.

15. The service authorization system of claim 14, wherein the service authorization server computer is further configured to provide the data service from the participating company server computer to the wireless terminal if the response contains an authorization indication.

16. The service authorization system of claim 14, wherein the service authorization server computer is further configured to provide the data service to the wireless terminal via a multi-modal message comprising at least two different message formats that are transmitted over the wireless access network to the wireless terminal.

17. The service authorization system of claim 14, wherein the participating company server computer is configured to generate the request for authorization in response to a predetermined event detected with the participating company server computer.

18. The service authorization system of claim 14, wherein the multi-modal request for authorization includes at least a voice-based message and a text-based message.

19. The service authorization system of claim 14, wherein the multi-modal request for authorization includes at least two messages selected from a group of messages consisting of a voice-based message, a text-based message, an email message, a short message, a chat message, a video message, a video conference message, or a voice-mail message.

20. The service authorization system of claim 14, wherein the service authorization server computer is further configured to create the multi-modal request for authorization only after confirmation from the user profile included in the virtual customer database that the respective user has not previously responded to a previous request for authorization to provide the data service.

21. The service authorization system of claim 14, wherein the service authorization server computer is further configured to update the user profile to indicate that the wireless terminal will not receive another request for authorization to provide the data service.

22. The service authorization system of claim 14, wherein the participating company server computer is configured to populate the user profile included in the virtual customer database with customer specific participating company data that includes indication of availability to the wireless terminal of the data service.

* * * * *

UNITED STATES PATENT AND TRADEMARK OFFICE
CERTIFICATE OF CORRECTION

| | |
|---|---|
| PATENT NO. | : 8,073,920 B2 |
| APPLICATION NO. | : 12/245508 |
| DATED | : December 6, 2011 |
| INVENTOR(S) | : Michael L. Gailey et al. |

It is certified that error appears in the above-identified patent and that said Letters Patent is hereby corrected as shown below:

Column 3, Line 47, please delete "a" after --or--.

Column 7, Line 1, please delete "responding" and insert --respond--.

Signed and Sealed this
Thirty-first Day of January, 2012

David J. Kappos
*Director of the United States Patent and Trademark Office*